James B. Saxon,
Inventor.
Koenig, Senniger,
Powers and Leavitt,
Attorneys.

3,527,875
HIGH VOLTAGE BUS CONNECTORS SHIELDED AGAINST CORONA DISCHARGE

James B. Saxon, Birmingham, Ala., assignor to Anderson Electric Corporation, Leeds, Ala., a corporation of Alabama Filed Nov. 8, 1967, Ser. No. 681,486
Int. Cl. H02g 5/00
U.S. Cl. 174—73 11 Claims

ABSTRACT OF THE DISCLOSURE

Connectors are described for electrically and mechanically connecting either a pair of high voltage bus bars or a single bus bar to an equipment terminal. The connectors include a rounded shield for supporting the buses and shielding the connection against corona discharge. A flexible S-shaped expansion coupling within the shield interconnects either the buses or the bus and the terminal.

BACKGROUND OF THE INVENTION

This invention relates to high voltage bus connectors, and more particularly to such connectors which support, shield against corona discharge, and permit bus expansion and contraction.

High voltage bus bars are frequently utilized in power stations and substations where the ambient temperature varies over a considerable range. The coefficient of expansion for the usual materials used in such bus bars, e.g., aluminum and copper, is relatively high with the result that reconcilable changes in the length of the buses occur as they expand or contract due to such temperature variations. Heretofore, expansion joints or couplings have been utilized at the juncture of two buses to accommodate for this movement. Such expansion couplings, however, are relatively large because of the substantial amount of bus movement that occurs in typical bus runs. A conventional expansion coupling of the prior art, for example, consists of a pair of thick braided leads connected at their ends to the ends of the bus bars and bowed outwardly near their centers to provide for axial movement of the buses while maintaining a continuous conductive path therebetween.

In extra high voltage (EHV) bus bar installations, additional problems are presented in connection with such expansion joints because of the formation of corona around the buses and joints. It is known that when an electrical connector having one or more sharp edges or corners is energized at a sufficiently high electric potential, an electrostatic discharge, known as corona, takes place from the edges to the surrounding atmosphere. This phenomenon, which is a major source of radio interference, stems from the fact that, for any potential of a conductor as a whole, the intensity of the electric field is greatest at the sharpest edge thereof, and may reach a magnitude at which the ambient atmosphere immediately adjacent the conductor breaks down. While it is known that the corona discharge can be reduced by rounding the sharp corners and edges of the conductor and joint, this procedure is very time consuming and costly. A technique which has been utilized in the past for corona or electrical field stress control of an EHV bus joint is to increase the apparent diameter of the conductor and joint by the use of one or more corona or grading rings. Such rings, however, are inherently large and costly, are difficult to install and maintain in proper alignment and are critical in placement.

SUMMARY OF THE INVENTION

Among the several objects of the invention may be noted the provision of EHV bus connectors which support the buses, shield the connection against corona discharge and permit substantial variations in the length of the buses due to expansion and contraction thereof; the provision of such connectors which eliminate the need for grading rings to control electrical field stress; the provision of such connectors which substantially reduce the size, number and complexity of parts while retaining the functions thereof; and the provision of such connectors which are characterized by simplicity of construction, low cost, ease of installation on a variety of different types of supports, and compactness in design. Other objects and features will be in part apparent and in part pointed out hereinafter.

Briefly, apparatus of this invention for connecting a first substantially rigid high voltage conductor to a second substantially rigid high voltage conductor comprises a hollow corona shield having a smooth rounded substantially continuous outer surface. The shield has an opening adapted to receive the first conductor. The end of the first conductor terminates within the shield and is supported by the shield for axial movement relative to the shield. In addition, a resilient expansion coupling is provided for interconnecting the ends of the first and second conductors. The expansion coupling is completely enclosed by the shield.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 2:
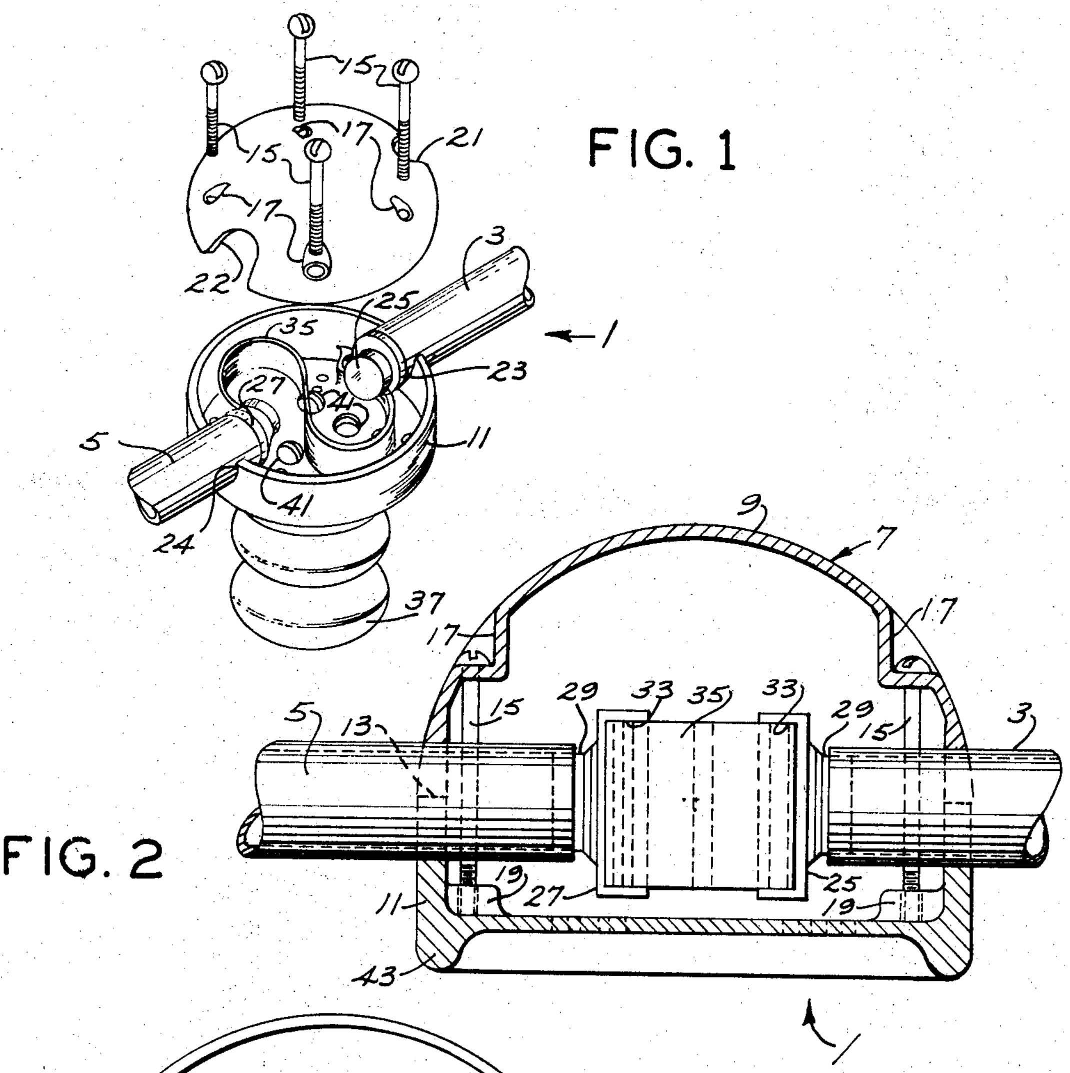
FIG. 1 is an exploded perspective view of a first embodiment of a connector of this invention.
FIG. 2 is a vertical section of the connector of FIG. 1.
Figure 3:
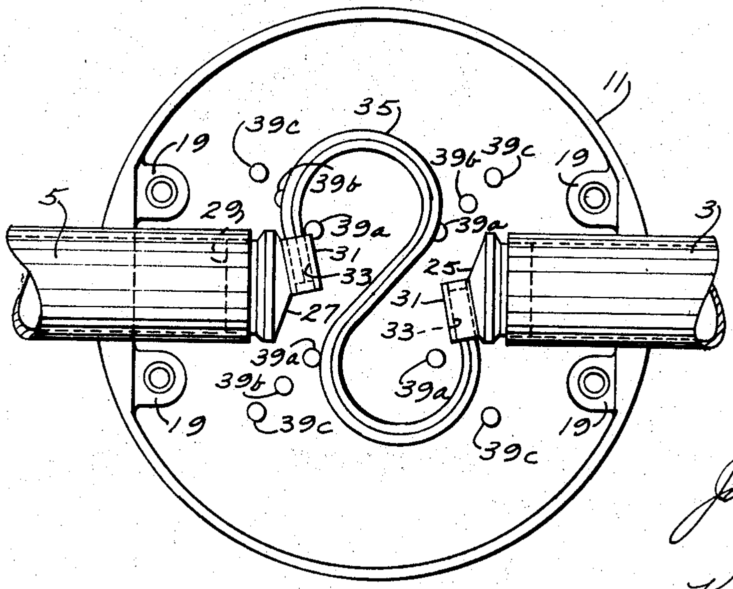
FIG. 3 is a horizontal section of the connector of FIG. 1.

Referring now to FIGS. 1–3, a first embodiment of the connector of this invention is indicated at 1 for connecting together a pair of end-to-end axially aligned substantially rigid high voltage electrical conductors 3 and 5. The conductors 3 and 5 may, for example, be extra high voltage (EHV) bus bars of the type used in power stations and substations. Buses 3 and 5 are of tubular aluminum or copper and have relatively large diameters for decreasing corona discharge along their runs. As will be set forth more fully hereinafter, the connector 1 supports the buses, permits axial movement thereof due to expansion and contraction with temperature variations, and shields the connection against corona discharge.

The apparatus 1 is constituted by a housing or corona shield 7 having two detachable portions, an upper generally hemispherical portion 9 and a lower cup-shaped portion 11. The upper and lower shield portions are adapted to be joined together at mating surfaces 13 by a plurality of threaded fasteners 15 extending down through recessed apertures 17 in the upper shield portion and threadedly engaging internally threaded protuberances 19 on the bottom of the lower shield portion. Upper and lower shield portions 9 and 11 are respectively provided with semicircular apertures 21, 22 and 23, 24 which mate to form generally circular openings for receiving and supporting buses 3 and 5 with the ends of the buses terminating within the shield.

Connected to the ends of buses 3 and 5 (or formed integrally therewith) within shield 7 are a pair of end caps or shunt bodies 25 and 27, each having a stud portion 29 of smaller external diameter than the internal diameter of the bus. This stud portion 29 is received in the bore of the bus and is secured to the bus by any suitable means, such as welding or bolt connections. At the other end of each of the end caps 25 and 27 is an eccentric head 31 having a slot 33 extending generally transversely to the axis of the bus. A generally S-shaped shunt or expansion coupling 35 is connected at its free ends to the end caps by welding it in slots 33. The expansion coupling 35 is a laminated assembly formed of a plurality of layers of a suitable electrically conductive material, such as aluminum. Similarly, end caps 25 and 27, which constitute means for securing the coupling to the ends of the buses, are formed of an electrically conductive material, such as aluminum, thereby providing a continuous conductive path between the buses 3 and 5. The openings 21, 23 and 22, 24 may be provided with a low friction bushing or shoe (not shown) to reduce bus and shield wear as the buses axially expand and contract.

Connector apparatus 1 is intended to be carried by a support, such as indicated by electrical insulator 37 in FIG. 1, for example. For this purpose, a plurality of concentric bolt hole circles are provided in the bottom of lower shield portion 11 for mating with one of several standard diameter bolt hole circles normally provided in such insulators. That is, as shown in FIG. 3 twelve holes are provided in the bottom of the lower shield portion arranged in three concentric bolt hole circles each defined by four holes designated 39*a*, *b* and *c*. Four threaded screws 41 secure lower shield portion 11 to the top of insulator 37. An optional, although preferable, depending peripheral skirt or lobe 43 (FIG. 2) extends from the lower edge of lower shield portion 11 for shielding the top of insulator 37 against corona discharge.

Figure 4:
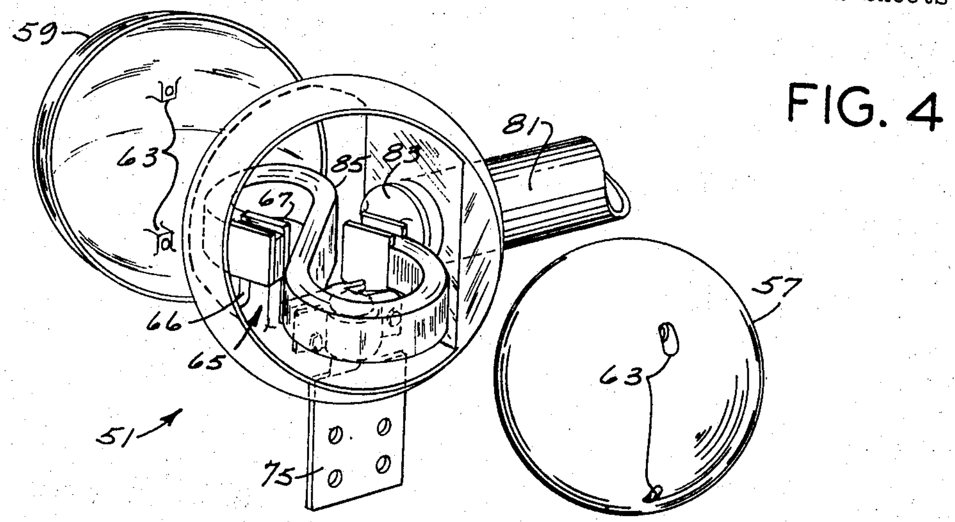
FIG. 4 is an exploded perspective view of a second connector embodiment of this invention.
Figures 5, 6:
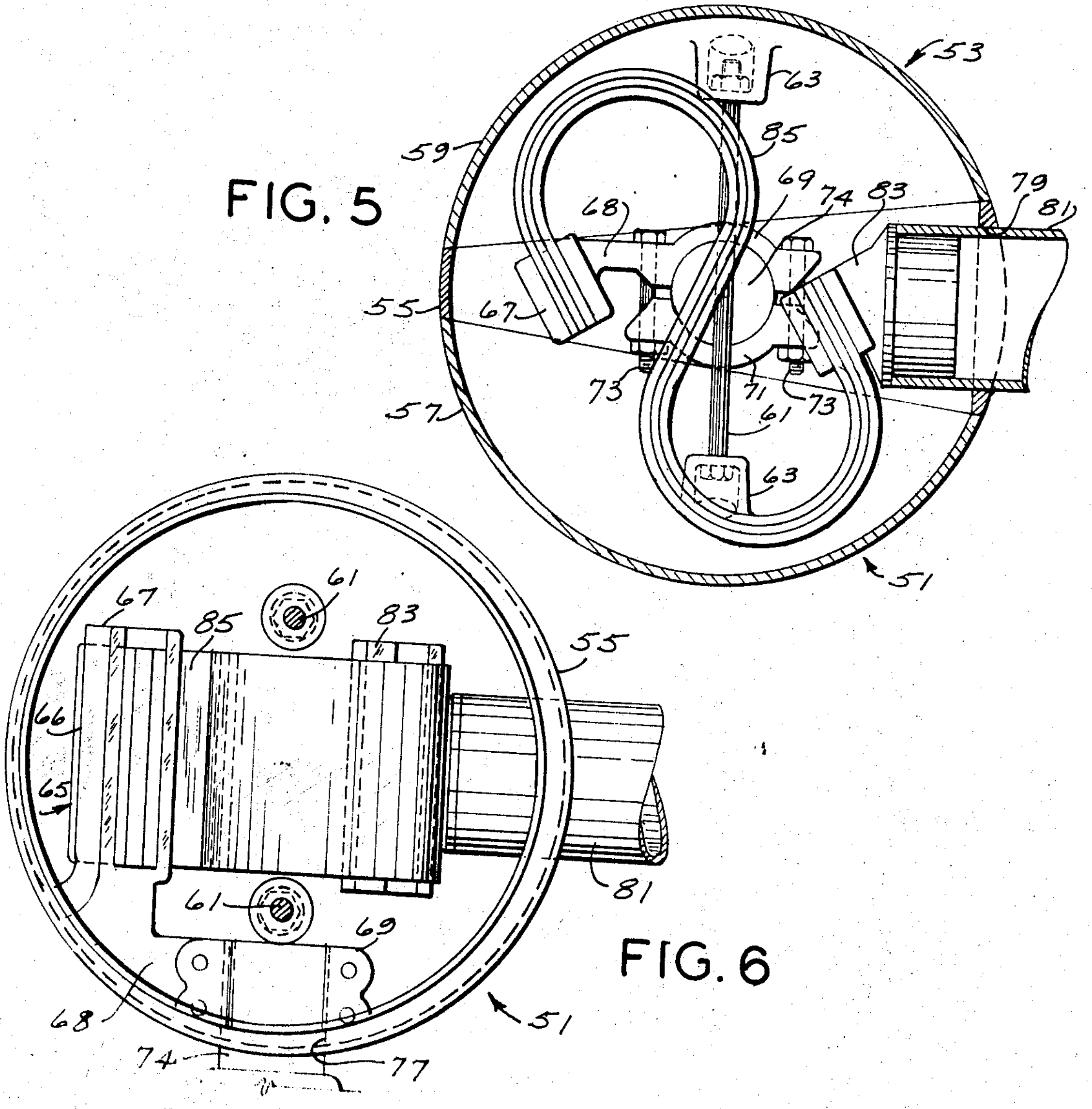
FIG. 5 is a horizontal section of the connector of FIG. 4.
FIG. 6 is a vertical section of the connector of FIG. 4.

A second embodiment of the connector for use in connecting an EHV bus to a terminal of a switch or transformer, for example, is illustrated in FIGS. 4–6. This connector, indicated generally at 51, is constituted by a hollow spherical housing or corona shield 53 formed in three parts designated 55, 57 and 59. As best illustrated in FIGS. 4 and 5, the intermediate part 55 is in the shape of a portion of a sphere bounded by two planes on opposite sides of a diametrical plane of the sphere, the two planes being at an angle to one another. The two side portions 57 and 59 are dome-shaped which mate with the intermediate portion on opposite sides thereof. These side shield portions are secured to the intermediate portion by a pair of bolts 61 extending through the intermediate portion between recessed apertures 63 in the side portions.

Within the intermediate shield portion 55 is a generally L-shaped arm 65 having a ribbed upstanding portion 66 terminating in a head 67 and a gusset constituting a transverse leg 68 terminating in a stud clamp 69. The arm 65 may be molded integrally with the center housing 55, or may be formed separately and secured thereto by any suitable means, such as welding. A mating half 71 of the stud or connector and bolts 73 are provided for clamipng a conductor, such as a stud 74 of a spade terminal 75, to arm 65, the stud passing through an aperture 77 in the bottom of intermediate shield portion 55. Alternatively, the stud or spade terminal may be formed integrally with the stud clamp or intermediate shield portion, in which case the aperture 77 would be omitted.

A second aperture 79 in intermediate shield portion 55 has an axis extending at a right angle or normal to the axis of the first aperture 77 in a vertical plane, although it is to be understood that the angle may be other than 90°. The portion of the intermediate shield portion around aperture 79 is of thicker construction than the remainder of the shield for receiving and supporting a tubular bus 81. An end cap or shunt body 83, similar to end caps 25 and 27 of FIGS. 1–3, is welded to the end of the bus within the housing 53 and a flexible laminated S-shaped expansion coupling or shunt 85 is connected between end cap 83 and the head 67 of arm 65.

Operation is as follows:

In the first embodiment of the connector shown in FIGS. 1–3, end caps 25 and 27 are assembled and welded to the free ends of expansion coupling 35 during manufacture of the connector. To interconnect and support buses 3 and 5 in a power station or substation, lower shield portion 11 is secured to the top of insulator 37, or other supporting means, by screws 41 passing through the bolt hole circle 39 corresponding in diameter to the bolt hole circle in the insulator. As set forth above, such insulators are normally provided with one of several different diameter bolt hole circles. The plural concentric bolt hole circles provided in lower shield portion 11 permit mating of the connector with any of such insulator circles.

When the lower shield portion 11 has been secured to insulator 37, buses 3 and 5 are placed in semiarcular apertures 23 and 24 with the ends of the buses terminating within the shield. The tubular portion 29 of end caps 25 and 27 are then inserted in the bores of the buses and are welded thereto, thereby electrically and mechanically connecting the buses. Since the coupling is resilient and is in the shape of an S, and since the buses are connected to the free ends thereof, the coupling is capable of considerable flexing as the buses expand and contract due to temperature changes. Thus, although the coupling is relatively compact in overall dimension, it is capable of handling relatively large axial bus movements.

The connection is completed by the addition of upper shield portion 9. This portion is secured to lower shield portion 11 by means of bolts 15 engaging internally threaded protuberances 19. When so assembled, the exterior of shield 7 provides a smooth rounded substantially continuous surface for electrical field stress control. In this respect, it should be noted that recessed apertures 17 in upper shield portion 9 eliminate protrusion of bolt heads 15. Furthermore, optional depending lobe 43 shields the top of insulator 37 while maintaining the continuity of the shield.

In the second embodiment of the connector shown in FIGS. 4–6, end cap 83 and expansion coupling 85 are assembled and welded to the head of arm 65 during manufacture. To interconnect bus 81 to a terminal 75 of a transformer, for example, the intermediate shield portion 55 is secured to the terminal by inserting stud 74 through aperture 77 and clamping it between clamps 69 and 71 with bolts 73. The bus 81 is then inserted through aperture 79 and the stud portion of end cap 83 is inserted in the bore thereof. A permanent connection is provided, for example, by welding or bolting the bus to the end cap. The side shield portions 57 and 59 are then secured to intermediate shield portion 55 by means of bolts 61 extending through the intermediate shield portion between recessed apertures 63.

It should be noted that opening 79 may be at least partially lined with a low-friction material to reduce wear as the bus moves axially due to expansion and contraction with temperature variations. It should also be noted that the angle between the axes of bus opening 79 and stud 77 may be varied during manufacture to suit a particular need, and that the connector may be secured directly to conductors other than studs. For example, clamps 69 and 71 may be formed to receive a flat blade bolted terminal rather than a stud.

As set forth above, buses 3, 5, and 81 are conventionally formed of either copper or aluminum. End caps 25, 27 and 83, intermediate shield portion 55, arm 65 and expansion couplings 35 and 85 of connectors 1 and 51 are formed of any suitable electrically conductive material. In a preferred form of the invention these parts are made of aluminum or an aluminum alloy. Shields 7 and 53 are similarly formed of aluminum, although a semiconductive synthetic resin material may be used (except for intermediate shield portion 55), such as a polyester. epoxy or acrylic resin made conductive in a manner well known in the art as, for example, by the addition of a small quantity of carbon black or the like.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

What is claimed is:

1. Apparatus connecting a first substantialy rigid high voltage conductor to a second substantially rigid high voltage conductor comprising a hollow corona shield having a smooth rounded substantially continuous outer surface, said corona shield being formed of at least two detachable portions, fasteners securing said detachable portions together, said shield having an opening receiving said first conductor with the end of said first conductor terminating within said shield and being supported by the shield for axial movement relative thereto, said second conductor terminating within said shield, and a resilient expansion coupling of S-shaped configuration including means at the free ends thereof for respective interconnection with said first and second conductors, said shield completely enclosing said expansion coupling.

2. Apparatus as set forth in claim 1 wherein said coupling comprises plural layers of an electrically conductive material.

3. Apparatus as set forth in claim 1 wherein said shield has a second opening coaxial with the first opening, said second opening receiving said second conductor with the end of said second conductor in axial alignment with the end of said first conductor, said second conductor being supported by said shield for axial movement relative to the shield.

4. Apparatus connecting a first substantially rigid high voltage conductor to a second substantially rigid high voltage conductor comprising a hollow corona shield having a smooth rounded substantially continuous outer surface, said corona shield being formed of an upper generally hemispherical portion and a lower cup-shaped portion, said portions being detachable one from the other, fasteners securing said detachable portions together, said shield having coaxial openings receiving said conductors with the ends thereof being in axial alignment and terminating within said shield, said conductors being supported by the shield for axial movement relative thereto, and a resilient expansion coupling interconnecting the ends of said first and second conductors, said shield completely enclosing said expansion coupling.

5. Apparatus as set for in claim 4 wherein the bottom of said lower shield portion has a plurality of concentric bolt hole circles for securing the apparatus to a support.

6. Apparatus as set forth in claim 5 further comprising a peripheral skirt depending from the lower edge of the lower shield portion for shielding the top of the support against corona discharge.

7. Apparatus as set forth in claim 6 wherein said coupling is of S-shaped configuration and includes means at the free ends thereof for respective interconnection with the first and second conductors.

8. Apparatus connecting a first substantially rigid high voltage conductor to a second substantially rigid high voltage conductor comprising a hollow corona shield having a smooth rounded substantially continuous outer surface, said corona shield having an intermediate portion in the shape of a portion of a sphere bounded by two planes on opposite sides of a diametrical plane of the sphere and a pair of dome-shaped portions mating with said intermediate portion on opposite sides thereof, said shield having an opening receiving said first conductor with the end of said first conductor terminating within said shield and being supported by the shield for axial movement relative thereto, said second conductor terminating within said shield, and a resilient expansion coupling interconnecting the ends of said first and second conductors, said shield completely enclosing said expansion coupling.

9. Apparatus as set forth in claim 8 wherein the two planes bounding the intermediate shield portion are at an angle to one another.

10. Apparatus as set forth in claim 9 wherein said intermediate shield portion has a second opening having an axis at an angle to the axis of said first opening and receiving said second conductor.

11. Apparatus as set forth in claim 9 wherein said coupling is of S-shaped configuration and includes means at the free ends thereof for respective interconnection to said conductors.

References Cited

UNITED STATES PATENTS

| | | | |
|---|---|---|---|
| 2,274,422 | 2/1942 | Mahoney et al. | 174—73 |
| 3,212,046 | 10/1965 | Abel et al. | 339—1 |
| 3,391,243 | 7/1968 | Whitehead. | |

OTHER REFERENCES

German printed application 1, 185, 268 (1965).

DARRELL L. CLAY, Primary Examiner

U.S. Cl. X.R.

174—169; 339—1